(12) United States Patent
Mahieux et al.

(10) Patent No.: US 7,860,003 B2
(45) Date of Patent: Dec. 28, 2010

(54) COMMUNICATION SESSION MANAGEMENT SYSTEM AND A STREAM CONCENTRATOR INCLUDING SUCH A SYSTEM

(75) Inventors: Yannick Mahieux, Begard (FR); David Deleam, Perros-Guirec (FR); Dominique Massaloux, Perros-Guirec (FR)

(73) Assignee: France Telecom, Paris (FR)

( * ) Notice: Subject to any disclaimer, the term of this patent is extended or adjusted under 35 U.S.C. 154(b) by 309 days.

(21) Appl. No.: 11/578,172

(22) PCT Filed: Apr. 20, 2004

(86) PCT No.: PCT/FR2004/000969
§ 371 (c)(1),
(2), (4) Date: Dec. 6, 2006

(87) PCT Pub. No.: WO2005/112365
PCT Pub. Date: Nov. 24, 2005

(65) Prior Publication Data
US 2007/0280281 A1    Dec. 6, 2007

(51) Int. Cl.
*H04J 1/16* (2006.01)
(52) U.S. Cl. .................................................. 370/231
(58) Field of Classification Search ......... 370/229–240, 370/241, 252, 253, 259–271, 464, 465, 468; 709/230, 231
See application file for complete search history.

(56) References Cited

U.S. PATENT DOCUMENTS

| | | | |
|---|---|---|---|
| 5,758,194 A | | 5/1998 | Kuzma |
| 6,628,677 B1 | | 9/2003 | Kobayashi |
| 7,023,839 B1 * | | 4/2006 | Shaffer et al. ............... 370/356 |
| 2002/0024945 A1 * | | 2/2002 | Civanlar et al. ............. 370/352 |
| 2002/0099853 A1 | | 7/2002 | Tsujii et al. |
| 2002/0163911 A1 * | | 11/2002 | Wee et al. .................... 370/389 |

(Continued)

FOREIGN PATENT DOCUMENTS

EP       0 751 685 A1     1/1997

(Continued)

OTHER PUBLICATIONS

Lee, Duan-Shin et al. "Control and Analysis of Video Packet Loss in ATM Networks," Optical Engineering, vol. 30, No. 7 (Jul. 1991).

(Continued)

*Primary Examiner*—Kwang B Yao
*Assistant Examiner*—Obaidul Huq
(74) *Attorney, Agent, or Firm*—Oliff & Berridge, PLC

(57) ABSTRACT

The invention relates, in particular, to a system for managing communication sessions between first terminals adapted to send audio and/or video and/or data streams during these sessions and second terminals accessible via an external data transmission network. The first terminals are connected to a stream concentrator itself connected to the external network. Since the streams sent by at least some of the first terminals are coded or intended to be coded by hierarchical encoders, the system includes means for processing said streams so that each of them is sent to the external network by the concentrator at a given hierarchy level and means for determining said hierarchy level as a function of parameters relating to the number and nature of the sessions set up between the first terminals and the second terminals.

15 Claims, 2 Drawing Sheets

U.S. PATENT DOCUMENTS

| | | | |
|---|---|---|---|
| 2003/0035478 A1* | 2/2003 | Taubman | 375/240.11 |
| 2003/0135631 A1* | 7/2003 | Li et al. | 709/231 |
| 2004/0004959 A1 | 1/2004 | Itakura | |
| 2004/0119814 A1* | 6/2004 | Clisham et al. | 348/14.08 |
| 2004/0170127 A1* | 9/2004 | Tanaka | 370/235 |
| 2005/0025053 A1* | 2/2005 | Izzat et al. | 370/231 |
| 2006/0150053 A1* | 7/2006 | van der Schaar et al. | 714/752 |

FOREIGN PATENT DOCUMENTS

| | | |
|---|---|---|
| FR | 2 831 377 | 4/2003 |
| JP | A-09-046680 | 2/1997 |
| JP | A-11-252555 | 9/1999 |
| JP | A-2003-308277 | 10/2003 |
| JP | A-2004-096309 | 3/2004 |

OTHER PUBLICATIONS

Duan-Shin Lee, "*Control and Analysis of Video Packet Loss in ATM Networks,*" Optical Engineering, Jul. 1991, pp. 955-964, vol. 3 No. 7.

Japanese Patent Office, *Japanese Notice of Rejection* for Japanese Patent Application No. 2007-508924 (with English translation), mailed Sep. 8, 2009, pp. 1-2.

Chinese Patent Office, *Chinese Office Action* for Chinese Patent Application No. 200480042793.8 (with English translation), mailed May 8, 2009, pp. 1-4 (translation pp. 1-8).

* cited by examiner

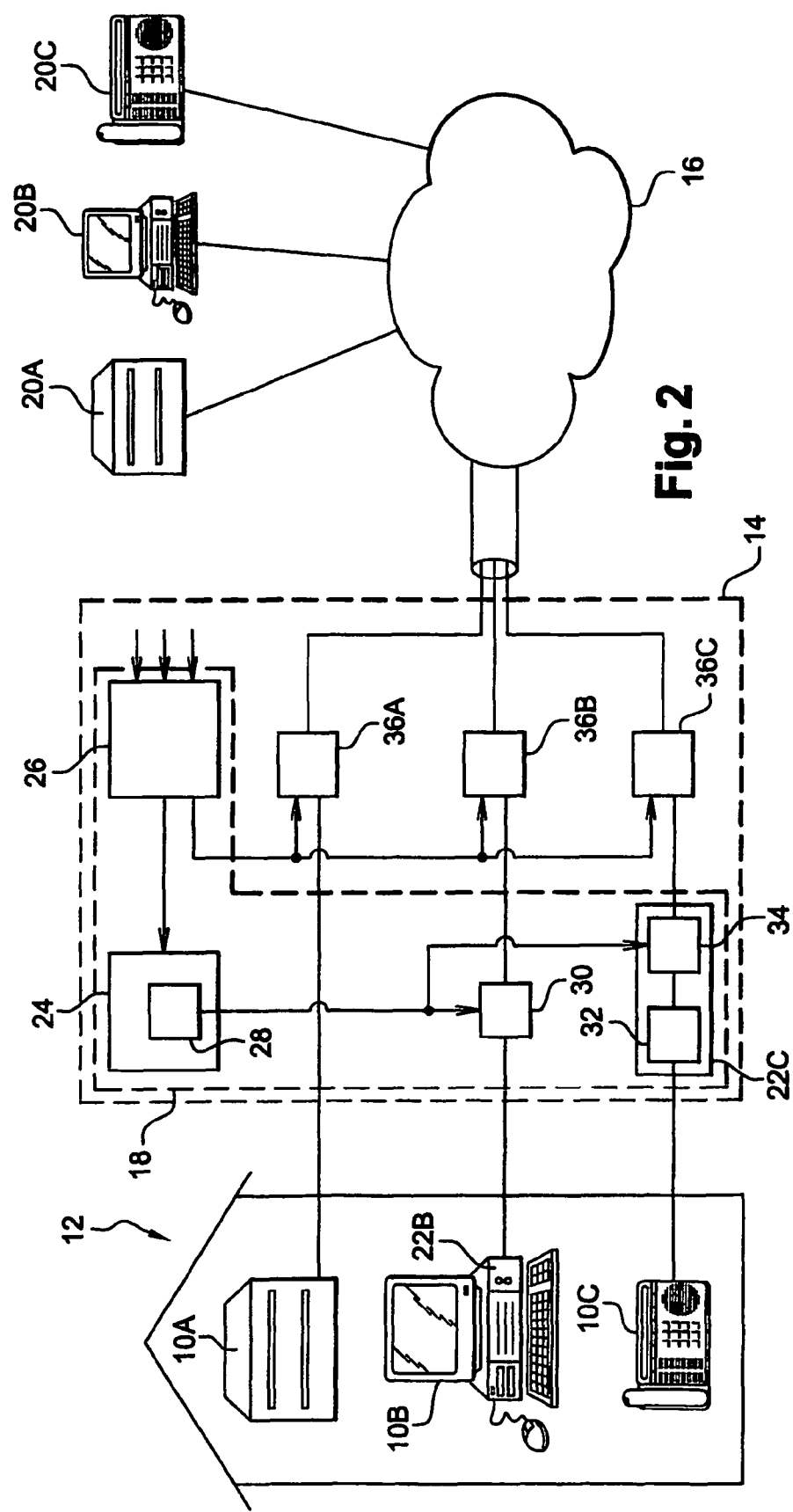

COMMUNICATION SESSION MANAGEMENT SYSTEM AND A STREAM CONCENTRATOR INCLUDING SUCH A SYSTEM

The present invention relates to a communication session management system and to a stream concentrator including such a system.

More precisely, the invention relates to a system for managing a plurality of communication sessions between first terminals adapted to send audio and/or video streams and/or data during the sessions and second terminals accessible via an external data transmission network, the first terminals being connected to a stream concentrator, itself connected to the external network.

A stream concentrator is an element of a transmission system through which a plurality of streams on which it can act pass in transit. Such concentrators may be, for example, domestic gateways, private automatic branch exchanges, etc. They may also be local area networks or wide area networks connected to a plurality of terminals.

One problem with these communication session management systems is that they are unable to optimize the transmission of data streams if the first terminals are of different kinds and have different capacities.

Moreover, they are generally unable to take into consideration the heterogeneous nature of the communication sessions resulting from the nature of the information exchanged and the sending and receiving capacities of the terminals.

Another problem is that of adapting the bit rate of the transmitted streams to dynamic variations in the transmission capacities of the terminals participating in the sessions. Such variations occur if one of the first terminals enters into a new session with one of the second terminals or terminates a session in progress, for example.

A first solution would be to limit the bit rates of the streams sent by the first terminals. This would therefore homogenize the sending of data from the first terminals and any first terminal could at any time enter into a communication session with a second terminal without impeding other communication sessions.

Such solutions are not satisfactory because they do not optimize the data transmission capacities of the system, especially if some of the first terminals are not participating in communication sessions. The quality of communication is therefore limited by the maximum number of communication sessions that the management system is able to manage.

Another solution consists in allocating the bit rate requested by any new session until the available bit rate is used up. This leads to a potential limitation on the number of simultaneous sessions.

The invention aims to solve the above problems by providing a communication session management system that is capable of adapting to the status of the communication sessions or other sessions such as TV over ADSL, Internet browsing, streaming, etc.

The invention therefore consists in a system for managing communication sessions between first terminals adapted to send audio and/or video and/or data streams during said sessions and second terminals accessible via an external data transmission network, the first terminals being connected to a stream concentrator itself connected to the external network, wherein the streams sent by at least some of the first terminals being coded or destined to be coded by hierarchical coders, the system including means for processing said streams so that each of them is sent to the external network by the stream concentrator at a given hierarchy level and means for determining said hierarchy level as a function of parameters relating to the number and nature of the sessions set up between the first terminals and the second terminals.

Thus the use of a hierarchical coding system means that each of the streams sent by the first terminals can be sized so that there is never any congestion of the stream concentrator, at the same time as optimizing its resources at all times. This is made possible by extracting parameters relating to the number and nature of the sessions set up between the first terminals and the second terminals to determine the hierarchy level of each stream sent.

The session management system optionally includes a module for truncating said streams sent by at least some of the first terminals and the stream processing means optionally include control means for controlling the truncation module so that each of said streams is truncated at the corresponding given hierarchy level.

This solution compensates the possible absence of means for adjusting the hierarchy level of the streams coded in certain hierarchical coders.

This solution also deals with situations in which the hierarchical coder for a stream sent by the first terminal is not implemented in the stream concentrator, but instead in the first terminal and the stream management system has no means of directly controlling the bit rate at the level of the first terminal.

The means for determining a given hierarchy level for a sent stream optionally define that hierarchy level on the basis of at least one parameter from the set comprising:

the capacity for sending from the stream concentrator to the external network;
the number of sessions and, for each session:
  the bit rate used and the bit rates that can be used for sending;
  constraints relating to the reception capacity of the remote terminals; and
  instantaneous bit rate information from one of the first terminals adapted to send data at a bit rate that can vary during a session.

The input parameters of the determination means are optionally collected at the time of initialization of a communication session or dynamically during a session.

The session management system optionally further comprises means for determining bit rates that the stream concentrator requires to receive from the second terminals as a function of parameters relating to the number and nature of the sessions set up between the first terminals and the second terminals.

The invention also consists in a stream concentrator including a communication session management system as described above.

This stream concentrator optionally forms a gateway between a domestic local area network including the first terminals and the external network.

This stream concentrator optionally forms a gateway between a connection server for connecting to a high bit rate local area network including the first terminals and the external network.

The stream concentrator described above may include at least a hierarchical coder for coding said streams sent by at least some of the first terminals. Management of the quality of the streams sent by the system is therefore totally transparent for the terminals connected to the local area network.

In this case, the stream processing means may include control means for controlling the hierarchical coder so that each of the streams sent is coded at the corresponding given hierarchy level.

Indeed, because some hierarchical coders are adapted to adjust themselves the hierarchy levels of the streams that they code, if the hierarchical coder is implemented in the stream concentrator, the stream concentrator is able to control such adjustment directly.

The invention can be better understood in the light of the following description, which is given by way of example only and with reference to the appended drawings, in which:

FIG. 1 is a diagram showing the composition of the bit stream of a hierarchically coded message;

FIG. 2 is a diagram of a first embodiment of a communication session management system of the invention.

Figure 3:
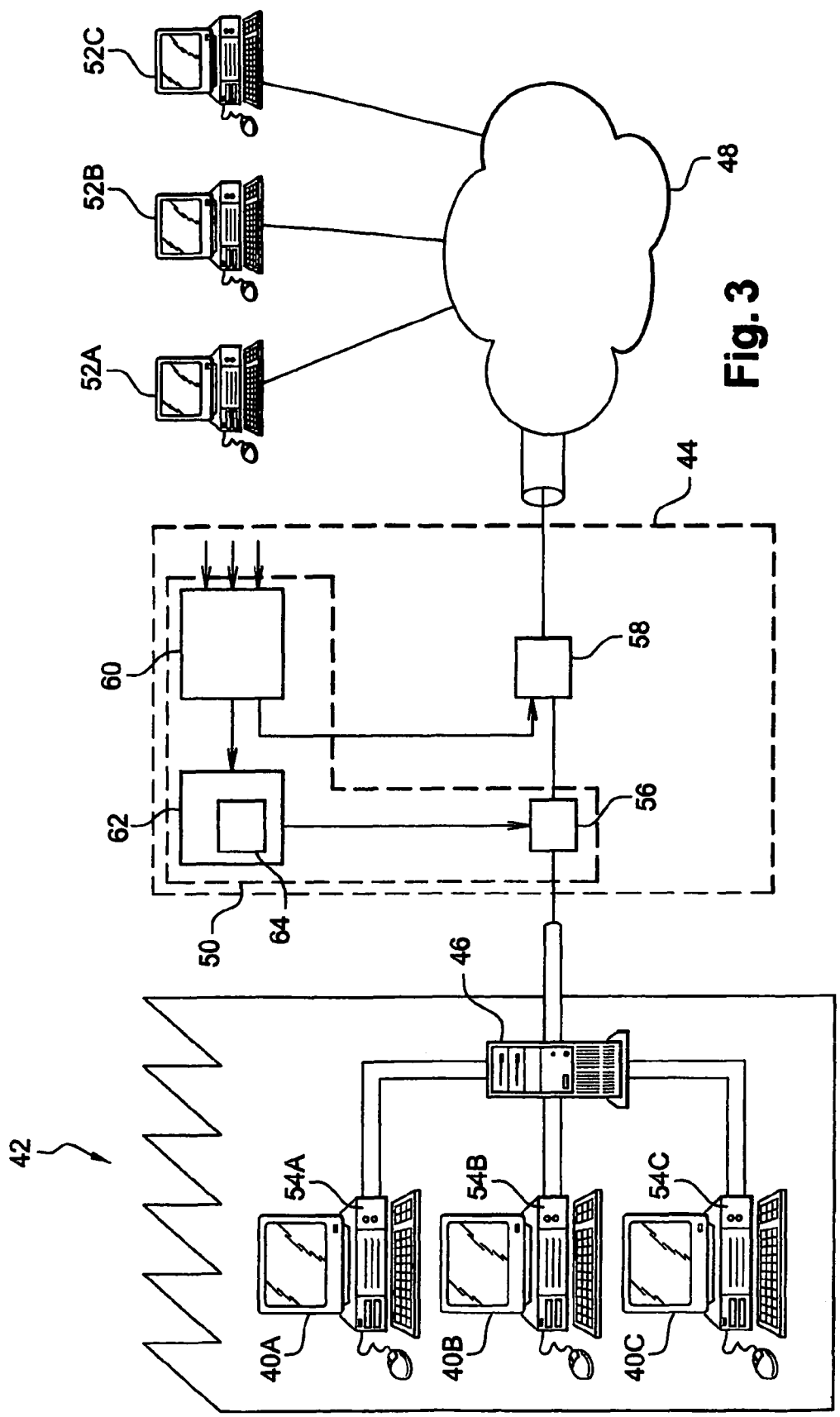
FIG. 3 is a diagram of a second embodiment of a communication session management system of the invention.

In hierarchical coding systems, also known as scaleable coding systems, binary data resulting from the coding operation is divided into successive layers. A base layer, also called "kernel", is formed of the bits absolutely necessary for decoding the bit stream, determining a minimum decoding quality.

The subsequent layers progressively improve the quality of the signal resulting from the decoding operation, each new layer providing new information which is processed by the decoder to supply at the output a signal of increasing quality.

One advantageous feature of hierarchical codecs is that they enable intervention at any level of the transmission or storage system to eliminate a portion of the bit stream without having to supply any particular indication to the coder or the decoder. The decoder uses the binary information that it receives and produces a signal of corresponding quality.

The information on the bit rate supplied to the decoder for a given packet or frame may be conveyed by external signaling or a signaling in the data transmitted. In packet mode, the communication terminal that receives hierarchical streams can also deduce the instantaneous bit rate directly from the size of the packets received. Various ways of signaling the instantaneous bit rate are known to the person skilled in the art and there is no further reference below to the signaling of the bit rate sent for the hierarchical coders.

In practice, hierarchical coding of audio or video signals or data generates, from a portion of the source signal (for example a 20 milliseconds (ms) frame of the speech signal in the case of certain audio coders), a bit stream represented by N bits separated into P successive groups of bits G1 to GP (corresponding to the P layers), as shown in FIG. 1 for P=3.

Of these groups, the first group G1 constitutes the kernel. The subsequent groups G2 to GP are the layers that enable consecutive quality improvements.

The bit stream from this kind of coder can therefore easily be truncated and the bit rate generated by the same coder can therefore be changed with guaranteed low processing complexity.

Accordingly, in FIG. 1, the group G1 alone, the groups G1 and G2 or the three groups G1, G2 and G3 may be transmitted. The respective expressions level 1, level 2 and level 3 hierarchy apply to these options. The bit rate DH1 offered by hierarchy level 1 is denoted D1, the bit rate DH2 offered by the combined groups G1 and G2 is denoted D1+D2, and the bit rate DH3 offered by all the groups G1 to G3 is denoted D1+D2+D3. Generally speaking, the bit rate DHQ offered by a hierarchy level Q is the sum of the bit rates of all the hierarchy levels at or below the level Q, that is to say:

$$DHQ = \sum_{p=i}^{0} Dp$$

Consider the example of a hierarchical speech coder operating on 20 ms frames offering a hierarchy on three levels: D1=8 kilobits per second (kbps) for the first group G1, D2=6 kbps for the second group G2, and D3=16 kbps for the third group G3. There is therefore an overall bit rate of 30 kbps, that is to say, for a frame, a bit stream of 75 bytes that can be divided into three consecutive groups G1, G2 and G3 of 20, 15 and 40 bytes, respectively.

FIG. 2 shows a first embodiment of the invention.

First multimedia terminals 10A, 10B and 10C of a domestic network 12 are connected to a stream concentrator 14 forming a gateway to an external data transmission network 16, for example the Internet network.

A system 18 for managing a plurality of sessions between the first terminals 10A, 10B, 10C and second terminals 20A, 20B, 20C accessible via the external network 16 is implemented in the gateway 14 in this embodiment.

The first terminals 10A, 10B, 10C are adapted to send audio and/or video and/or data streams during these sessions. More precisely, the communication sessions are as follows:

an analog fax machine 10A may set up a session with an analog fax machine 20A;

a personal computer 10B may set up a session with a personal computer 20B; and an analog telephone 10C may set up a session with an analog telephone 20C.

Alternatively, the personal computer may be replaced by an IP phone type telephone also including a hierarchical coder having the feature of supporting discontinuous transmission with detection of voice activity so that the bit rate can be reduced during periods of voice inactivity (silence, background noise). Generally speaking, a terminal can thus support a coder having the property of sending streams whose bit rate varies locally over time (variable bit rate coder).

The streams sent by the personal computer 10B and the analog telephone 10C are intended to be coded by means of hierarchical coders 22B and 22C.

In the case of the personal computer 10B, the stream received by the gateway is coded hierarchically by the coder 22B in the personal computer 10B.

In the case of the analog telephone, the stream received by the gateway is not coded. The hierarchical coder 22C for this stream is therefore in the gateway 14. More precisely, the coder 22C includes coding means 32 in series with a truncation module 34 for coding at the highest possible hierarchy level (maximum bit rate).

The management system 18 includes means 24 for processing the streams sent from the first terminals so that they are sent to the external network 16 via the gateway 14, each at a given hierarchy level.

The management system 18 further includes means 26 for determining this hierarchy level as a function of parameters relating to the number and nature of the sessions set up between the first terminals 10A, 10B, 10C and the second terminals 20A, 20B, 20C, as a function of the sending capacity from the gateway to the external network 16, and particularly as a function of the nature of the hierarchical coders 22C and 22B, as a function of constraints relating to the reception capacity of the second terminals 20B and 20C, and/or as a function of the instantaneous bit rate of the terminal 10B able to send data at a bit rate that can vary during a session.

In order for the streams sent and coded by the computer 10B to be truncated afterwards in order to be coded at the corresponding given hierarchy level, the management system 18 includes a truncation module 30 and the stream processing means 24 include control means 28 for controlling the truncation module 30.

Similarly, in order for the stream sent by the analog telephone 10C and coded by the hierarchical coder 22C to be truncated at the corresponding given hierarchy level, the control means 28 also operate on the hierarchical coder 22C.

In a first variant, the control means 28 operate on the truncation module 34 of the hierarchical coder 22C.

In a second variant, the coder 22C need not include a truncation module 34, in which case the control means 28 operate directly on the coding means 32.

The gateway 14 further includes data sending means 36A, 36B and 36C adapted to the nature of the external network 16 associated with each of the streams sent by the first terminals for sending those streams to the external network. For example, in the case of an IP network, these means incorporate IP packet forming means.

FIG. 3 represents a second embodiment of the invention.

First multimedia terminals 40A, 40B and 40C of a high bit rate local area network 42 (for example an optical fibre local area network) are connected to a stream concentrator 44 via a connection server 46. The stream concentrator forms a gateway to an external data transmission network 48, for example the Internet network.

A system 50 for managing a plurality of sessions between the first terminals 40A, 40B, 40C and second terminals 52A, 52B, 52C accessible via the external network 48 is implemented in the gateway 44 in this embodiment.

In this embodiment, for simplicity, the three multimedia terminals 40A, 40B, 40C are similar. For conciseness, only the terminal 40A is described in detail.

The terminal 40A is a personal computer, for example, adapted to send audio and/or video and/or data streams during a session with a remote terminal 52A accessible via the external network 48.

The terminal 40A is usually a high-performance unit and itself generates a data stream hierarchically coded by a hierarchical coder 54A (the terminals 40B and 40C are likewise provided with hierarchical coders 54B and 54C).

The gateway 44 comprises a truncation module 56 and means 58 for forming packets from truncated data so that they can pass in transit over the IP network 48 at an appropriate bit rate.

To determine the appropriate bit rate, and therefore the hierarchy level at which the data of each session managed by the gateway 44 must be coded, the gateway comprises, as in the previous embodiment, means 60 for determining this hierarchy level as a function of parameters relating to the number and nature of the sessions set up between the first terminals 40A, 40B, 40C and the second terminals 52A, 52B, 52C, as a function of the capacity for sending from the gateway to the external network 48, as a function of the types and bit rates of the hierarchical coders 54A, 54B and 54C, and/or as a function of constraints relating to the reception capacity of the second terminals 52A, 52B and 52C.

The gateway 44 comprises processing means 62 for processing the stream sent by the terminal 40A. The processing means 62 operate on the stream via control means 64 for controlling the truncation module 56 so that the stream sent and coded by the terminal 40A is truncated in order to be coded at the corresponding hierarchy level.

An application of the system of the invention to managing a plurality of sessions is described next, also with reference to FIG. 2.

To simplify the description, only symmetrical exchanges of data are considered, meaning that the bit rates are the same in both transmission directions.

The first and second coders 22B and 22C implement the three-level hierarchical coding of FIG. 1, providing bit rates of D1=8 kbps, D2=6 kbps and D3=16 kbps.

The terminal 10B sets up a session S1 with the remote terminal 20B, whereas the terminals 10A and 10C are inactive. For this application it is considered that the gateway 14 is connected to the external network 16 by an ADSL.

The determination means 26 consider the capacity of the ADSL (32 kbps) and the capacity that the remote terminal 20B indicates that it is able to receive (64 kbps), and send the processing means 24 the hierarchy level at which the data relating to the session S1 must be coded. The level determined is level 3, corresponding to the maximum bit rate (30 kbps) for transmission of data sent by the terminal 10B.

The terminal 10C then requires to set up a session S2 with the remote terminal 20C, and the gateway 14 is informed of this.

The determination means 26 calculate that it is not possible to insert the new session S2 without modifying the bit rate of the session S1, because the bit rate available on the ADSL is 2 kbps, whereas the minimum bit rate D1 for the transmission stream of the session S2, corresponding to hierarchy level 1, is 8 kbps.

The management system 18 then carries out the following actions:
  determination by the means 26 that data relating to the session S1 must be coded at level 2, corresponding to the bit rate D1+D2 (14 kbps);
  sending to the processing means 24 the new hierarchy level 2, corresponding to the new bit rate D1+D2 (14 kbps);
  truncation of the data sent and coded by the terminal 10B at hierarchy level 2, effected by the means 30 under the control of the means 28;
  determination by the means 26 that data relating to the session S2 must be coded at level 2, corresponding to the bit rate D1+D2 (14 kbps);
  sending to the processing means 24 this hierarchy level for the session S2; and
  coding the data sent by the terminal 10C at the hierarchy level 2, effected by the means 22C under the control of the means 28.

When the session S1 ends, the determination means 26 consider the unused load of the line and, as a consequence of this, indicate to the processing means 24 that the stream relating to this session S2 should be coded at level 3, corresponding to the bit rate D1+D2+D3=30 kbps.

The reception capacity of any of the remote terminals 20A, 20B and 20C is also liable to vary, for example if the line that connects it to the external network 16 is shared with other transmissions. This terminal then signals to the gateway 14 changes in respect of the bit rates that it is able to receive.

It will be noted that the invention is not limited to the embodiments described above.

Accordingly, in one variant the first terminals 10A, 10B, 10C of the first embodiment are remote, i.e. belong to different local area networks.

In another variant one of the first terminals includes a coder that is not compatible with hierarchical coding, so that it is then necessary to provide a decoder in the gateway before proceeding to hierarchical coding of a stream sent by this first terminal.

It will be noted that the elements 24, 26, 30, 22C, 62, 60, 56 of the management system 18, 50 are not necessarily located in a single processing unit and may be divided between different locations of the communication system.

In a complementary variant, the communication session management system also optimizes incoming streams entering the stream concentrator 14, 44 i.e. the bit rates sent by the remote terminals. This function is provided if the second terminals 20A, 20B, 20C, or 52A, 52B, 52C are connected to the external network 16 or 48 via a stream concentrator identical to the stream concentrator 14 or 44, for example. Remember that the terminals are able to inform the other end of their reception capacity. These means exist in the prior art; it may be a question of signaling in the packets or external signaling. The respective expressions inband signaling and outband signaling are then used. For example, the IETF defines the CMR (codec mode request) field in the packet formats.

Accordingly, in the FIG. 2 situation, the packet forming means 36B and 36C may introduce into the packets information on the receive bit rates required by the first terminals 10B and 10C, for example.

The system may then include means for determining the bit rates that it requires to receive, as a function of parameters relating to the number and nature of sessions set up between the first terminals and the second terminals, similar to the means 26 for determining the hierarchy level of the streams sent by the stream concentrator 14.

In this way, the system is able to contribute to sizing the streams sent by the second terminals to optimize the resources at the input of the stream concentrator in order to prevent congestion or wastage.

The means for determining a given bit rate for a stream optionally define that bit rate on the basis of at least one of the parameters from the set comprising:
the capacity of the stream concentrator to receive from the external network; and
the number of sessions and, for each session, the reception bit rate used and the reception bit rates that can be used.

Clearly, depending on circumstances, these parameters are collected when the session is initialized or dynamically during a session.

The invention claimed is:

1. A system for managing communication sessions between first terminals adapted to send streams of audio data and/or video data and/or data during said sessions and second terminals accessible via an external data transmission network, the first terminals being connected to a stream concentrator forming a gateway to the external network, wherein the streams of data sent by at least some of the first terminals are coded by hierarchical coders, each hierarchical coder being adapted to encode a corresponding stream of data into a plurality of successive layers of coded data that give together a maximum bit rate of the corresponding stream of data, the plurality of successive layers corresponding to a plurality of hierarchy levels from a base hierarchy level defining a minimum quality of the corresponding stream of data up to a respective maximum hierarchy level defining a maximum quality of the corresponding stream of data, wherein the stream concentrator includes:
means for determining, successively for each of the sent streams of data and among the corresponding plurality of hierarchy levels, a hierarchy level of coded data as a function of parameters relating to the number and nature of the sessions set up between the first terminals and the second terminals, wherein, for at least one of the sent streams of data, an intermediate hierarchy level that is lower than the respective maximum hierarchy level is determined, and
means for processing the sent streams of data so that each of the sent streams of data is sent to the external network by the stream concentrator at the corresponding determined hierarchy level of data, wherein the at least one of the sent streams of data is sent at the determined intermediate hierarchy level that is lower than the respective maximum hierarchy level to change the bit rate of the at least one of the sent streams of data compared to the maximum bit rate and then, to size the sent streams of data to avoid congestion of the concentrator.

2. A session management system according to claim 1, including a module for truncating said streams sent by at least some of the first terminals, and wherein the stream processing means include control means for controlling the truncating module so that each of said streams is truncated at the corresponding given hierarchy level.

3. A session management system according to claim 1, wherein the means for determining a given hierarchy level for a sent stream define that hierarchy level on the basis of at least one parameter from the set comprising:
the capacity for sending from the stream concentrator to the external network;
the number of sessions and, for each session:
the bit rate used and the bit rates that can be used for sending;
constraints relating to the reception capacity of the remote terminals; and
instantaneous bit rate information from one of the first terminals adapted to send data at a bit rate that can vary during a session.

4. A session management system according to claim 1, wherein the input parameters of the determination means are collected at the time of initialization of a communication session or dynamically during a session.

5. A session management system according to claim 1, further comprising means for determining bit rates that the stream concentrator requires to receive from the second terminals as a function of parameters relating to the number and nature of the sessions set up between the first terminals and the second terminals.

6. A stream concentrator including a session management system according to claim 1.

7. A stream concentrator according to claim 6, forming the gateway between a domestic local area network including the first terminals and the external network.

8. A stream concentrator according to claim 6, forming the gateway between a connection server for connecting to a high bit rate local area network including the first terminals and the external network.

9. A stream concentrator according to claim 6, including at least a hierarchical coder for coding said streams sent by at least some of the first terminals.

10. A stream concentrator according to claim 9, wherein the stream processing means include control means for controlling the hierarchical coder so that each of the streams sent is coded at the corresponding given hierarchy level.

11. A session management system according to claim 1, further including at least a hierarchical coder for coding said streams at a hierarchy level and wherein the means for determining determines a lower hierarchical level as said given hierarchy level.

12. A session management system according to claim 11, wherein said hierarchical coder codes the streams at a highest possible hierarchy level offering a maximum bit rate.

13. A session management system according to claim 2, wherein said first terminals further include at least a hierarchical coder for coding said streams at a hierarchy level and wherein the means for determining determines a lower hierarchical level as said given hierarchy level.

14. A session management system according to claim 1, wherein said stream concentrator comprises at least a hierarchical coder for coding said streams at said given hierarchy level, and the hierarchical coder is directly driven by said means for processing.

15. A session management system according to claim 2, wherein said stream concentrator comprises at least a hierarchical coder for coding said streams at a hierarchy level, in series with said truncating module.

* * * * *